US008365259B2

(12) United States Patent
Chaudhry et al.

(10) Patent No.: US 8,365,259 B2
(45) Date of Patent: Jan. 29, 2013

(54) SECURITY MESSAGE PROCESSING

(75) Inventors: Jay Chaudhry, Saratoga, CA (US); Jose Raphel, Austin, TX (US); Kailash Kailash, San Jose, CA (US); Sivprasad Udupa, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 967 days.

(21) Appl. No.: 12/128,391

(22) Filed: May 28, 2008

(65) Prior Publication Data
US 2009/0300730 A1 Dec. 3, 2009

(51) Int. Cl.
*G06F 9/00* (2006.01)
(52) U.S. Cl. .................. 726/5; 726/11; 726/12; 726/13
(58) Field of Classification Search ........... 726/5, 11–13
See application file for complete search history.

(56) References Cited

U.S. PATENT DOCUMENTS

| | | | | |
|---|---|---|---|---|
| 6,112,221 | A * | 8/2000 | Bender et al. ................ | 718/102 |
| 6,240,533 | B1 * | 5/2001 | Slemmer ........................ | 714/48 |
| 6,279,113 | B1 * | 8/2001 | Vaidya .......................... | 726/23 |
| 6,526,448 | B1 * | 2/2003 | Blewett ........................ | 709/238 |
| 6,571,287 | B1 | 5/2003 | Knight et al. | |
| 6,775,285 | B1 * | 8/2004 | Moles et al. ................... | 370/392 |
| 6,957,334 | B1 * | 10/2005 | Goldstein et al. ............. | 713/170 |
| 7,055,173 | B1 * | 5/2006 | Chaganty et al. ............. | 726/11 |
| 7,089,428 | B2 * | 8/2006 | Farley et al. .................. | 726/22 |
| 7,120,934 | B2 * | 10/2006 | Ishikawa ........................ | 726/23 |
| 7,171,681 | B1 * | 1/2007 | Duncan et al. ................ | 726/11 |
| 7,197,660 | B1 * | 3/2007 | Liu et al. ....................... | 714/4.12 |
| 7,243,373 | B2 * | 7/2007 | Muttik et al. .................. | 726/24 |
| 7,398,400 | B2 * | 7/2008 | Wiseman ....................... | 713/188 |
| 7,444,638 | B1 * | 10/2008 | Xu .................................. | 718/104 |
| 7,478,429 | B2 * | 1/2009 | Lyon .............................. | 726/23 |
| 7,725,587 | B1 * | 5/2010 | Jacoby et al. ................. | 709/229 |
| 7,797,752 | B1 * | 9/2010 | Vaidya et al. .................. | 726/27 |
| 7,856,664 | B2 * | 12/2010 | De Gaetano .................. | 726/30 |
| 2002/0108059 | A1 * | 8/2002 | Canion et al. ................. | 713/201 |
| 2005/0193430 | A1 * | 9/2005 | Cohen et al. .................. | 726/25 |
| 2006/0005231 | A1 | 1/2006 | Zuk et al. | |
| 2006/0155671 | A1 * | 7/2006 | Bantz et al. .................... | 707/1 |
| 2006/0195896 | A1 * | 8/2006 | Fulp et al. ..................... | 726/11 |
| 2007/0143827 | A1 * | 6/2007 | Nicodemus et al. ........... | 726/2 |
| 2010/0031358 | A1 * | 2/2010 | Elovici et al. ................. | 726/24 |

FOREIGN PATENT DOCUMENTS
WO WO 03/061273 A1 7/2003

OTHER PUBLICATIONS

Digital Visual Interface; Revision 1.0; Digital Display Working Group (DDWG); Apr. 2, 1999.*
PCT International Search Report and the Written Opinion, PCT/US2009/044978, Dec. 24, 2009, 11 pages.

* cited by examiner

*Primary Examiner* — Edan Orgad
*Assistant Examiner* — James Turchen
(74) *Attorney, Agent, or Firm* — Clements Bernard PLLC; Lawrence A. Baratta, Jr.; Christopher L. Bernard

(57) ABSTRACT

Systems, methods and apparatus for handling security messages in a distributed security system. Requests, replies, and/or updates have varying time constraints. Processing node managers and authority node managers determine the best transmission times and/or the ignoring of such data to maximize information value.

30 Claims, 11 Drawing Sheets

SECURITY MESSAGE PROCESSING

BACKGROUND

This specification relates to security provisioning.

The prevalence and accessibility of computer networks requires security measures to protect valuable information. An enterprise, for example, can implement such security measures by use of a layered security system. Such a layered security system can be implemented at the network edge of the enterprise, e.g., firewalls, gateway security agents, etc. Additionally, a layered security system can also include security processes and agents that are implemented throughout the enterprises, e.g., virus scanning software on each computer device within the enterprise, content filtering software, content monitoring software, on the enterprise gateway, etc.

Many layered security systems also cannot readily maintain a central data store of threat data that classifies content items such as files, URLs, e-mails according to security classifications (e.g. virus, malware, spam mail, etc.). Such layered security systems also do not implement a distribution infrastructure to communicate and share content intelligence. This results in repeated processing of both good and bad content. For example, information related to a virus outbreak detected in an enterprise location can not be readily propagated to a central office or other branches of the enterprise; uniform resource locators (URLs) found to include malicious software ("malware") or objectionable content can not be readily propagated to a central office or other branches of the enterprises, etc.

If a security system is provided beyond a network edge, the implementation of a central data store at an authority node and the distribution of threat data to and from processing nodes can improve system performance. One approach is to distribute security messages, e.g., requests for threat data, guard table data, update notifications, etc., to and from a centralized data store or to or from a distributed authority data store. However, depending on the particular circumstances at a processing node or an authority node, awaiting requests and/or sending responses to such requests may not realize a performance increase. Furthermore, in some situations, awaiting requests and/or sending responses to such requests may actually degrade overall system performance.

SUMMARY

The subject matter described in this specification is directed to distributed security message processing. When security related messages resulting from content inspection, changes in a user base, detection of fraudulent activity, etc., are communicated in real time in a distributed system, there are number of duplicated, stale and untimely information exchanges. Each message has a time varying benefit and the system attempts to maximize the benefit by processing the messages according to the best possible processing time, if such processing time is realizable.

In general, one aspect of the subject matter described in this specification can be embodied in methods that include the following actions in a processing node: identifying a content item; generating a security request for the content item, the security request including one or more time constraints; determining whether a first security operation for the security request can be performed within the one or more time constraints; and transmitting the security request to an authority node if the processing node determines that the first security operation can be performed within the one or more time constraints. Other implementations of this aspect include corresponding systems, apparatus, and computer program products.

Another aspect of the subject matter described in this specification can be embodied in methods that include the following actions in an authority node: receiving a request for a first security operation from a processing node, the security request defining one or more time constraints; determining whether the first security operation can be performed within the one or more time constraints; and initiating performance of the first security operation only if the authority node manager determines that the first security operation can be performed within the one or more time constraints. Other implementations of this aspect include corresponding systems, apparatus, and computer program products.

The subject matter described in this specification also includes other aspects. Additionally, one or more of the following optional advantages can be realized by implementations of the subject matter described in this specification. A cache hit ratio for security related data is improved in the processing nodes that are distributed across a wide geographic region. Processing delays are reduced by ensuring that security data is available in a cache when a lookup operation is initiated. Processing delays are also reduced by determining whether a first security operation (e.g., receiving at a processing node threat classification data of a content item) can be accomplished within a time constraint, or whether it is more time-cost efficient to initiate a second security operation (e.g., scanning the content item at the processing node) to determine the threat classification data. These optional advantages can be separately realized, and need not be realized in any particular implementation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
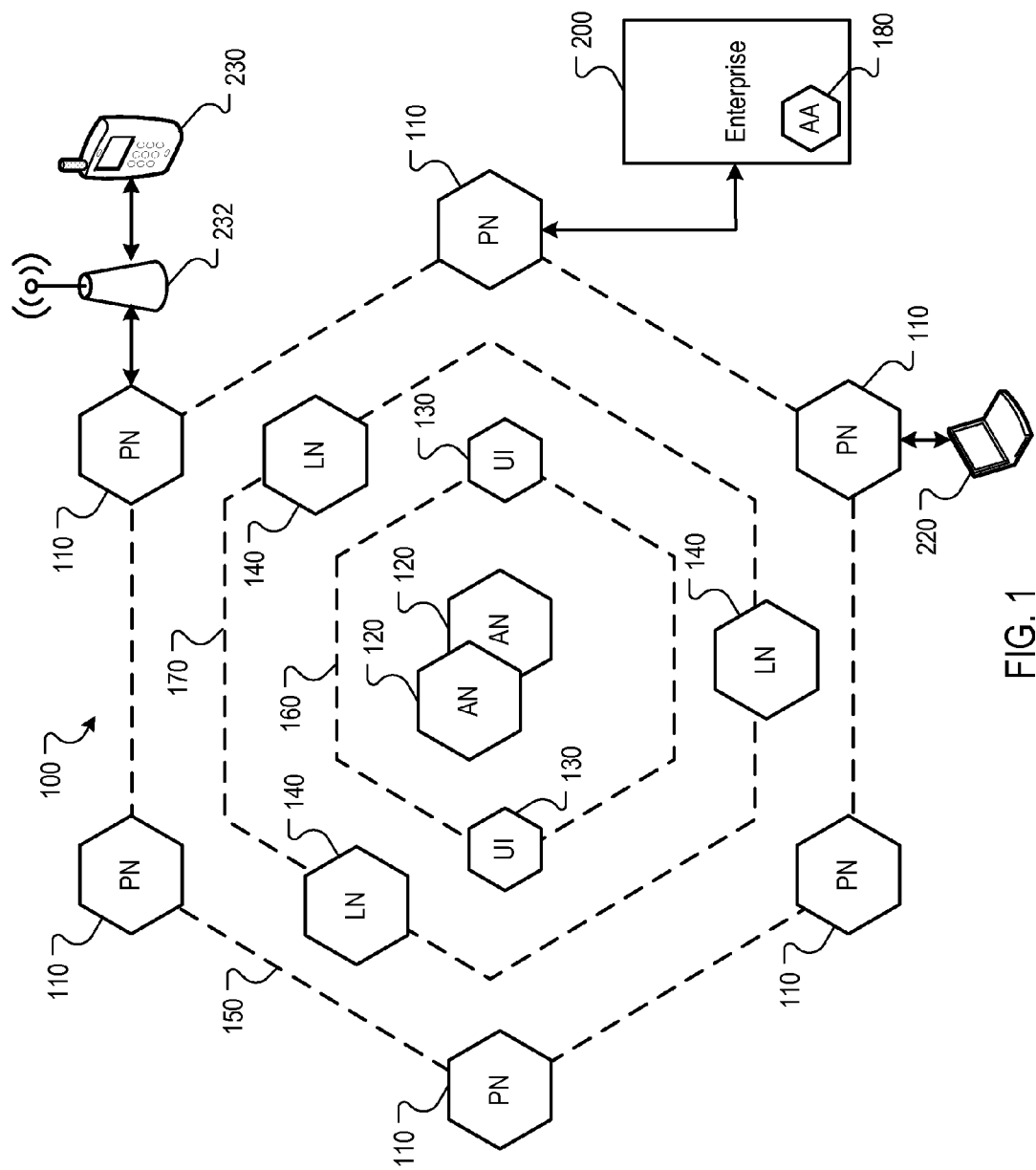
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system. Example external systems can include an enterprise 200, a computer device 220, and a mobile device 230, or other network and computing systems.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can generate a decision vector $D=[d1, d2, \ldots, dn]$ for a content item of one or more parts $C=[c1, c2, \ldots, cm]$. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, for any part $C=[c1, c2, \ldots, cm]$ of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the access nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can implemented by push and pull distribution schemes described in more detail below.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines and dictionaries for the processing nodes.

Other application layer functions can also be provided in the application layer, such as a user interface front-end 130. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system.

In some implementations, the logging node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or logging node 140 data can be further encrypted, e.g., so that only the enterprise (or user if a single user account) can have access to the logging node 140 data for its account. Other processes of anonymizing, obfuscating, or securing logging node 140 data can also be used.

In some implementations, an access agent 180 can be included in the external systems. For example, an access agent 180 is deployed in the enterprise 200. The access agent 180 can, for example, facilitate security processing by providing a hash index of files on a client device to a processing node 110, or can facilitate authentication functions with a processing node 110, e.g., by assigning tokens for passwords and sending only the tokens to a processing node so that transmission of passwords beyond the network edge of the enterprise is minimized. Other functions and processes can also be facilitated by an access agent 180.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes.

For example, a browser may be configured either manually or through an access agent 180 to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, at the within the enterprise an access agent 180 can be configured to perform MPLS labeling.

In another transparent proxy mode example, a protected system, such as the enterprise 200, may identify a processing node 110 as a next hop router for communication with the external servers.

§2.0 Example Detailed System Architecture and Operation

Figure 2:
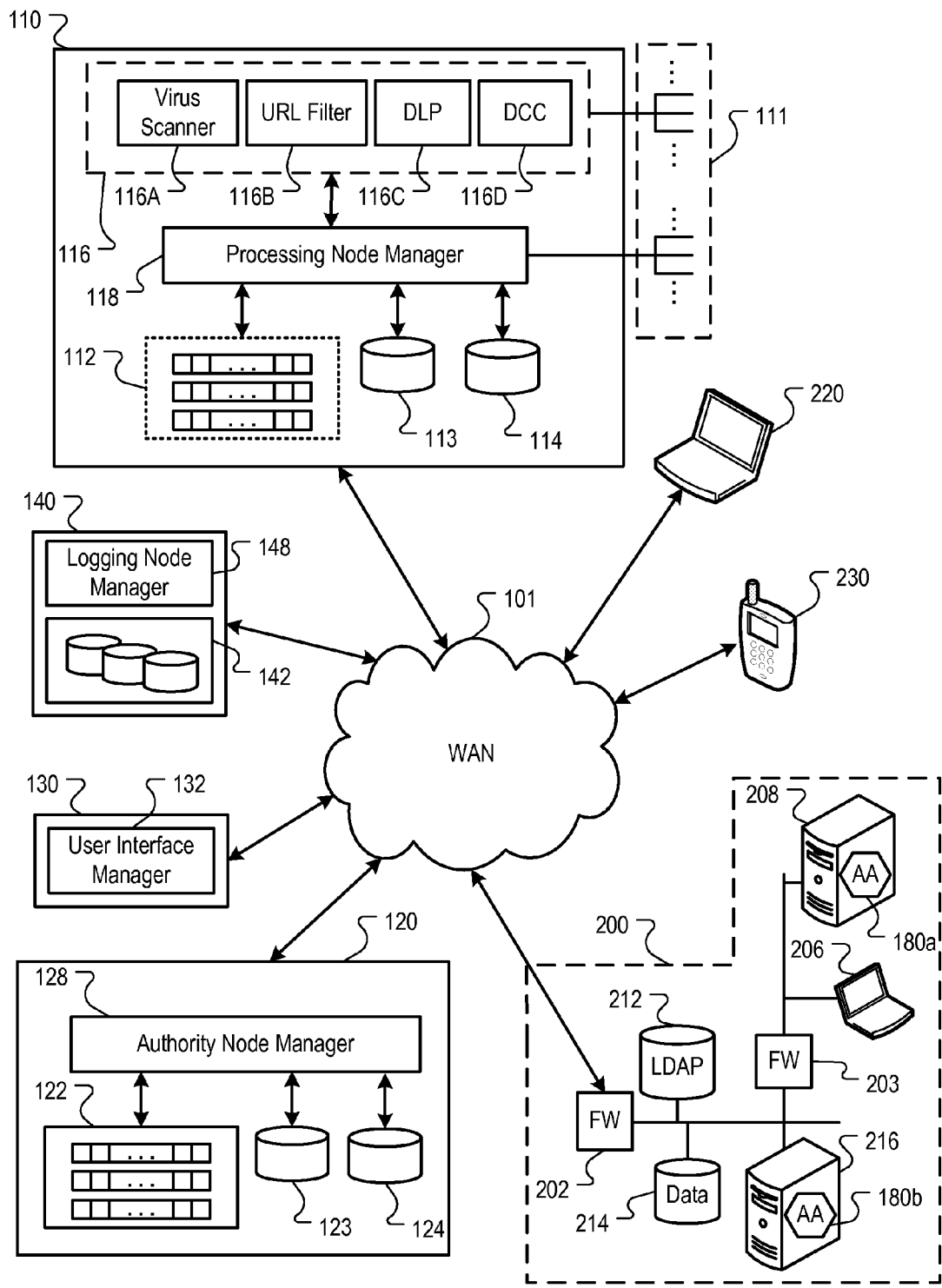
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects in data communication the processing node 110, authority node 120 and logging node 140. The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 206, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include a user identifiers, login passwords, and a login history associated with each user identifier. The other data 214 can include sensitive information, such as bank records, medical records, trade secret information, or any other information warranting protection by one or more security measures.

In some implementations, a client access agent 180a can be included on a client computer 208. The client access agent 180a can, for example, facilitate security processing by providing a hash index of files on the user computer 208 to a processing node 110 for malware and/or virus detection. Other security operations can also be facilitated by the access agent 180a.

In some implementations, a server access agent 180b can facilitate authentication functions with a processing node 110, e.g., by assigning tokens for passwords and sending only the tokens to a processing node 110 so that transmission of passwords beyond the network edge of the enterprise is minimized. Other functions and processes can also be facilitated by the server access agent 180b.

The computer device 220 and the mobile device 230 can also store information warranting security measures, such as personal bank records, medical information, and login information, e.g., login information to the server 206 of the enterprise 200, or to some other secured data provider server.

§2.1 Example Processing Node Architecture

In some implementations, the processing nodes 110 are external to network edges of the external systems 200, 220 and 230. Each processing node 110 stores security policies 113 received from the authority node 120 and monitors content items requested by or sent from the external systems 200, 220 and 230. In some implementations, each processing node 110 can also store a detection process filter 112 and/or threat data 114 to facilitate the decision of whether a content item should be processed for threat detection.

A processing node manager 118 can manage each content item in accordance with the security policy data 113, and the detection process filter 112 and/or threat data 114, if stored at the processing node 110, so that security policies for a plurality of external systems in data communication with the processing node are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" can be precluded. Those content items having an unknown status, e.g., content items that have not been processed by the system 100, can be threat detected to classify the content item according to threat classifications.

The processing node 110 can include data inspection engines 116. Each data inspection engine 116 can be configured to perform a threat detection process to classify content items according to a threat classification for a corresponding threat. For example, the data inspection engines can include a virus scanner engine 116A that can classify a content item as infected or clean, a network URL filter 116B that can classify a URL address as allowed or restricted, a data leakage protection (DLP) engine 116C that can identify a content item as secure or leaking, and a dynamic content categorization (DCC) engine 116D that can classify a content item as passed or failed.

The list of the data inspection engines 116A-116D is illustrative only; many other data inspection engines 116 can also be used, as can multiple instances of data inspection engines, e.g., different type data leakage engines implementing different data leakage algorithms. The calling of any particular data inspection engine 116 can be predicated on the type of content item to be threat detected. For example, a URL request from the enterprise 200 may cause the processing node manager 118 to call only the URL filter engine 116B.

Because the amount of data being processed by the processing nodes 110 can be substantial, the detection processing filter 112 can be used as the first stage of an information lookup procedure. For example, the detection processing filter 112 can be used as a front end to a looking of the threat data 114. Content items can be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence.

Each content item can have an information key that is hashed. For example, the processing node manager 118 may identify the URL address of a URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 can thus improve performance of queries where the answer to a request for information is usually negative. Such instances can include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information.

In some implementations, the detection processing filter 112 can be a Bloom filter implemented by a single hash function. The Bloom filter can be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

In some implementations, the processing node 110 can utilize a layered threat detection architecture 111. The layered threat detection architecture 111 can utilize a multi-layered feedback scheme that abstracts thread data between each layer. An example layered threat detection architecture 111 is shown and described in FIG. 3. Other threat detection architectures can also be used, however, and such architectures need not be layered.

§2.2 Example Authority Node Architecture

In general, the authority node 120 includes a data store that stores master security policy data 123 for each of the external systems 200, 220 and 230. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

The authority node 120 can also store a master detection process filter 122. The detection processing filter 122 can include data indicating whether content items have been processed by one or more of the data inspection engines 116 in any of the processing nodes 110. The authority node manager 128 can be used to manage the master detection processing filter 122, e.g., receive updates from a processing nodes 110 when a processing node 110 has processed a content item and update the master detection processing filter 122. In some implementations, the master detection processing filter 122 can be distributed to the processing nodes 110, which then store a local copy of the detection processing filter 112.

In some implementations, the detection processing filter 122 can be a guard table. The processing node 110 can, for example, use the information in the local detection processing filter 112 to quickly determine the presence and/or absence of information, e.g., whether a particular URL has been checked for malware; whether a particular executable has been virus scanned, etc.

The authority node 120 can also store master threat data 124. The master threat data 124 can classify content items by threat classifications, e.g., a list of known viruses, a list of known malware sites, spam e-mail domains, etc. The authority node manager 128 can be used to manage the master threat data 124, e.g., receive updates from a processing nodes 110 when a processing node 110 has processed a content item and update the master threat data 124 with any pertinent results. In some implementations, the master threat data 124 can be distributed to the processing nodes 110, which then store a local copy of the threat data 114.

In some implementations, the authority node 120 can also monitor the health of each processing node 110, e.g., the resource availability in each processing node 110, detection of link failures, etc. Based on the observed health of each process node 110, the authority node 120 can redirect traffic among processing nodes 110 and/or balance traffic among the processing nodes 110. Other remedial actions and processes can also be facilitated by the authority node 110.

§2.3 Example Processing Node and Authority Node Communications

The processing node 110 and the authority node 120 can be configured according to one or more push and pull processes to manage content items according to security policy data 113 and/or 123, detection process filters 112 and/or 122, and the threat data 114 and/or 124.

§2.3.1 Threat Data Push

In a threat data push implementation, each processing node 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system.

If, however, the content item is determined to not be classified by the threat data 114, then the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In some implementations, the authority node manager 128 can automatically transmit the updated threat data to other processing nodes 110. Accordingly, threat data for new threats as the new threats are encountered are automatically distributed to each processing node 110. Upon receiving the new threat data from the authority node 120, each processing node manager 118 can store the updated threat data in the locally stored threat data 114.

§2.3.2 Threat Data Pull and Push

In a threat data pull and push implementation, each processing node 110 stores policy data 113 and threat data 114. The processing node manager 118 determines whether a content item requested by or transmitted from an external system is classified by the threat data 114. If the content item is determined to be classified by the threat data 114, then the processing node manager 118 can manage the content item according to the security classification of the content item and the security policy of the external system.

If, however, the content item is determined to not be classified by the threat data, then the processing node manager 118 can request responsive threat data for the content item from the authority node 120. Because processing a content item may consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data store. If responsive threat data is stored in the master threat data 124, then the authority node manager 128 provide a reply that includes the responsive threat data to the processing node 110 so that the processing node manager 118 can manage the content item in accordance with the security policy data 112 and the classification of the content item.

Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

§2.3.3 Detection Process Filter and Threat Data Push

In a detection process filter and threat data push implementation, each processing node 110 stores a detection process filter 112, policy data 113, and threat data 114. The processing node manager 118 accesses the detection process filter 112 to determine whether the content item has been processed.

If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency.

If the content item is classified by the threat data 114, then the processing node manager 118 can manage the content item in accordance with the security policy data 113 and the classification of the content item.

Conversely, if the processing node manager 118 determines that the content item is not classified by the threat data 114, or if the processing node manager 118 initially determines through the detection process filter 112 that the content item is not classified by the threat data 114, then the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in turn, can update the master threat data 124 and the master detection process filter 122 stored in the authority node data store according to the threat data update received from the processing node 110. In some implementations, the authority node manager 128 can automatically transmit the updated threat data and detection processing filter to other processing nodes 110. Accordingly, threat data and the detection processing filter for new threats as the new threats are encountered are automatically distributed to each processing node 110, and each processing node 110 can update its local copy of the detection processing filter 112 and threat data 114.

§2.3.4 Detection Process Filter and Threat Data Pull and Push

In a detection process filter and threat data pull and push implementation, each processing node 110 stores a detection process filter 112, policy data 113, and threat data 114. The processing node manager 118 accesses the detection process filter 112 to determine whether the content item has been processed.

If the processing node manager 118 determines that the content item has been processed, it can determine if the content item is classified by the threat data 114. Because the detection process filter 112 has the potential for a false positive, a lookup in the threat data 114 can be implemented to ensure that a false positive has not occurred. The initial check of the detection process filter 112, however, can eliminate many null queries to the threat data 114, which, in turn, conserves system resources and increases efficiency.

If the processing node manager 118 determines that the content item has not been processed, it can request responsive threat data for the content item from the authority node 120. Because processing a content item may consume valuable resource and time, in some implementations the processing node 110 can first check with the authority node 120 for threat data 114 before committing such processing resources.

The authority node manager 128 can receive the responsive threat data request from the processing node 110 and can determine if the responsive threat data is stored in the authority node data store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112.

Conversely, if the authority node manager 128 determines that responsive threat data is not stored in the master threat data 124, then the authority node manager 128 can provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests for related to responsive threat data for the content item from other processing nodes 110 can be readily served with responsive threat data.

The various push and pull data exchange processes provided above are example processes for which the threat data and/or detection process filters can be updated in the system 100 of FIGS. 1 and 2. Other update processes, however, can also be used.

The data inspection engines 116, processing node manager 118, authority node manager 128, user interface manager 132, logging node manager 148, and authority agent 180 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. Other processing architectures can also be used, e.g., a combination of specially designed hardware and software, for example.

§3.0 Layered Threat Detection

Figure 3:
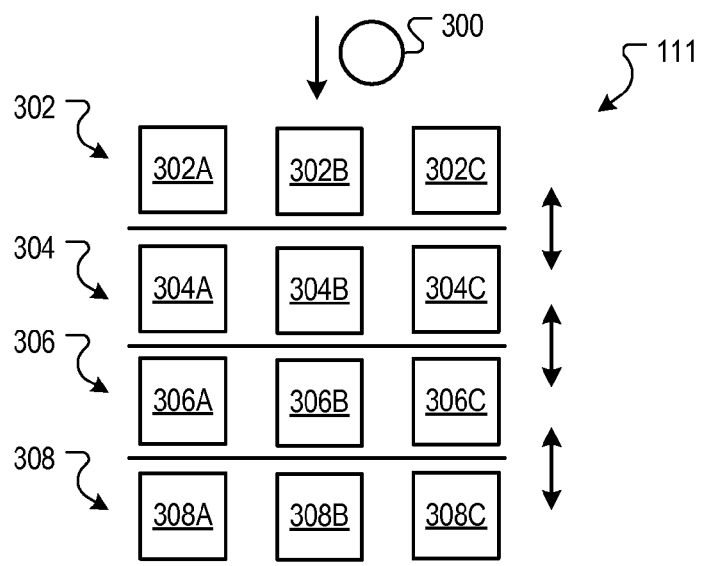
FIG. 3 is a block diagram of a multilayer threat detection architecture.

FIG. 3 is a block diagram of a multilayer threat detection architecture. In some implementations, each processing node 110 can analyze the requests and responses 300 according to the multilayer threat detection architecture that includes one or more data inspection layers 302, 304, 306 and 308 include one or more detection processes that operate in parallel. Example layers can include a user layer 302, a network layer 304, an object layer 306 and a content layer 308. Other layers and architectures can also be used.

The user layer 302 can include one or more user layer inspection engines 302A, 302B and 302C configured to perform user layer processes. Example user layer processes include login authentications, session time outs, token validations, etc.

The network layer 304 can include one or more user layer inspection engines 304A, 304B and 304C configured to perform network layer processes. Example network layer processes include internet protocol address checking, allowing or disallowing a content item associated with an internet protocol address, etc.

The object layer 306 can include one or more object layer inspection engines 306A, 306B and 306C configured to perform object layer processes. Example object layer processes include identifying a hypertext transfer protocol header associated with a content item and allowing or disallowing the content item based on the identified hypertext transfer protocol header, metadata filtering, etc.

The content layer 308 can include one or more content layer inspection engines 308A, 308B and 308C configured to perform content layer processes. Example content layer processes include virus scanning a content item and allowing or disallowing the content item based on the virus scanning; rejecting files base on a file type, etc.

In some implementations, each layer 302, 304, 306 and 308 can provide threat classification feedback to an upper layer. In one implementation, each layer has a set of decision systems that feeds back the findings to the upper layer for abstracting the threat findings. For example, after a virus scan, the content layer 308 can provide the result to the object layer 306. The object layer 306 can then index the findings against the object identity of the content (for example URL with content checksum) and record the findings for future use. Thereafter, a check at the objection layer 306 can identify the content as infected, and a separate process in the content layer 308 need not be initiated. This information can be stored in the threat data 114 and shared with other processing nodes 110 and/or the authority node 120, as described above. By way of another example, the content layer 308 may detect contents from a specific address as pornographic content. The object layer 306 can record the specific page as a pornographic page and provide this information to the network parameter layer 304. After a sufficient number of pages from destination (e.g., internet protocol address or domain name) are identified as pornographic, the network parameter layer 304 can then index a specific destination as pornographic using the internet protocol address or domain name. Thereafter, a check at the network parameter layer 304 can identify the page or content as objectionable, and a separate process at layers 306 and 308 can be precluded. This information can be stored in the threat data 114 and shared with other processing nodes 110 and/or the authority node 120, as described above.

At a highest level, a user's continued violation of security policies can result in either a lock out or limited access to resources from the user account. For example, if network layer 304 feeds back data identifying the detection of frequent security violations (e.g., attempted access to sites having malware, attempted access to pornographic sites, and the requesting of infected files) associated with a user account, then the user account may itself be locked down or access privileges curtailed (e.g., the user may only be allowed access within an enterprise intranet, and all requests outside of the enterprise firewall may be precluded). This information can be stored in the threat data 114 and shared with other processing nodes 110 and/or the authority node 120, as described above.

In some implementations, the content layer 308 processes can be implemented in the data inspection engines 116 of a processing node 110, and the user layer 302, network layer 304 and object layer 306 processes can be implemented in the processing node manager 118. Other layer distributions can also be used.

The example implementations described above perform security functions for external systems external to the network edges of the external systems, saving network resources in the external systems. All transactions are logged as log data 142 in one or more logging nodes 140 by a logging node manager 148. Thus, security log data can be collected and/or stored external to the network edges of the external systems, resulting in very little security log related traffic within the external systems. The security log data, however, can be readily accessed by the user interface front-end 130. For example, a user interface manager 132 can be used to generate log reports, execute security scenarios, monitor network traffic, etc.

§4.0 Example Processes for Providing Distributed Security Provisioning

Figure 4:
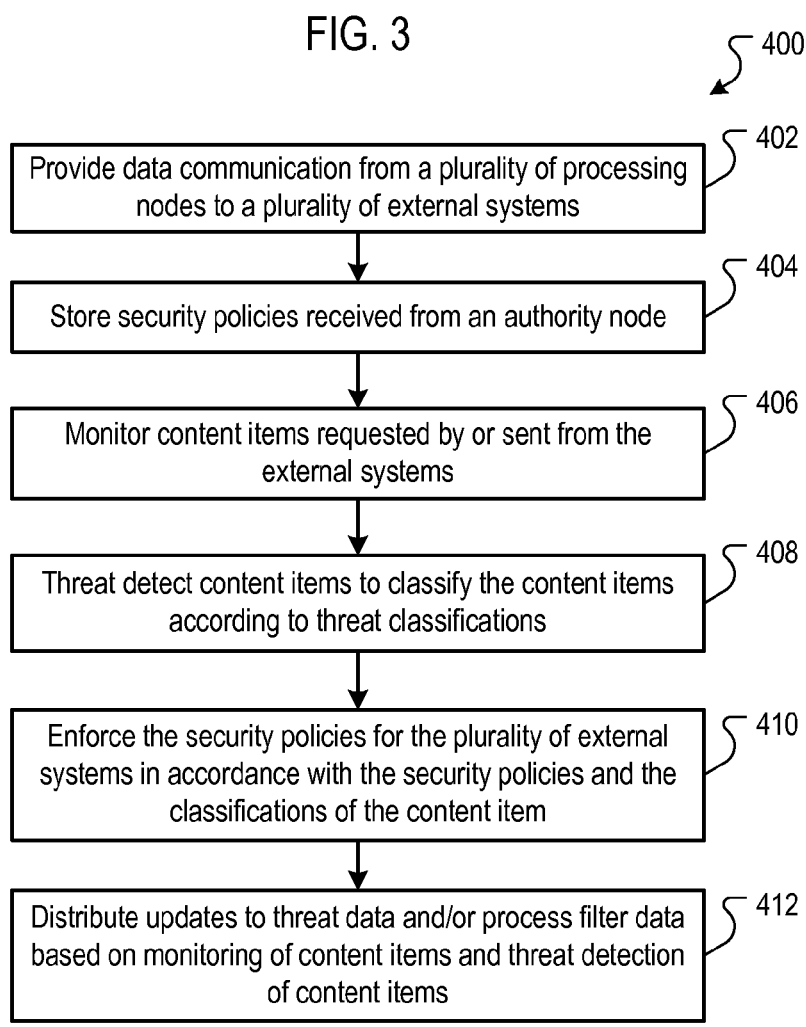
FIG. 4 is a flow diagram of an example process for providing distributed security provisioning.

FIG. 4 is a flow diagram of an example process 400 for providing distributed security provisioning. The process 400 can, for example, be implemented in the system 100 of FIGS. 1 and 2, or in other security systems having a distributed architecture. The stages shown in FIG. 4 are each processes that can be executed independently and concurrently as appropriate.

Stage 402 provides data communication from a plurality of processing nodes to a plurality of external systems. For example, the processing nodes 110 can be used to establish data communication with the external system 200, 220 and 230.

Stage 404 stores security policies received from an authority node. For example, the processing nodes 110 can store the security policy data 113 received from an authority node 120. The authority node 120 can provide the security policy data 113 in response to accessing the master security policy data 123.

Stage 406 monitors content items requested by or sent from the external systems. For example, the processing nodes 110 can monitor files, URL requests, and e-mail communications sent to and requested by the external systems 200, 220 and 230. Data communications can be monitored by the system 100 in a variety of ways, depending on the size and data requirements of the external system. For example, the enterprise 200 may have multiple routers that are used to communicate over the Internet, and the routers may be configured to establish communications through the nearest (in traffic communication time) processing node 110. The mobile device 230 may be configured to communicate to a nearest processing node 110 through any available wireless access device, such as an access point, or a cellular gateway. The single computer device 220, such a consumer's personal computer, may have its browser and e-mail program configured to access the nearest proxy node 110, which, in turn, serves as a proxy for the computer device 220. Alternatively, an Internet provider may have all of its customer traffic processed through processing nodes 110.

Stage 408 threat detects content items to classify the content items according to threat classifications. For example, the data inspection engines 116 of a processing node 110 can perform threat detection processes such as virus scans and URL malware detection to classify the content items according to virus and malware classifications.

Stage 410 enforces the security policies for the plurality of external systems in accordance with the security policies and the classifications of the content item. For example, the processing node 110 can manage the content items according to the threat classifications on the content items and the security policies of each external system 200, 220 and 230.

Stage 412 distributes updates to threat data and/or process filter data based on monitoring of content items and threat detection of content items. For example, the processing node 110 and/or the authority node 120 can distributes updates to threat data and/or process filter data based on monitoring of content items and threat detection of content items. The updates can be distributed by any of the push/pull schemes described above, or according to any one of the flow diagrams of FIGS. 5-8 below.

Figure 5:
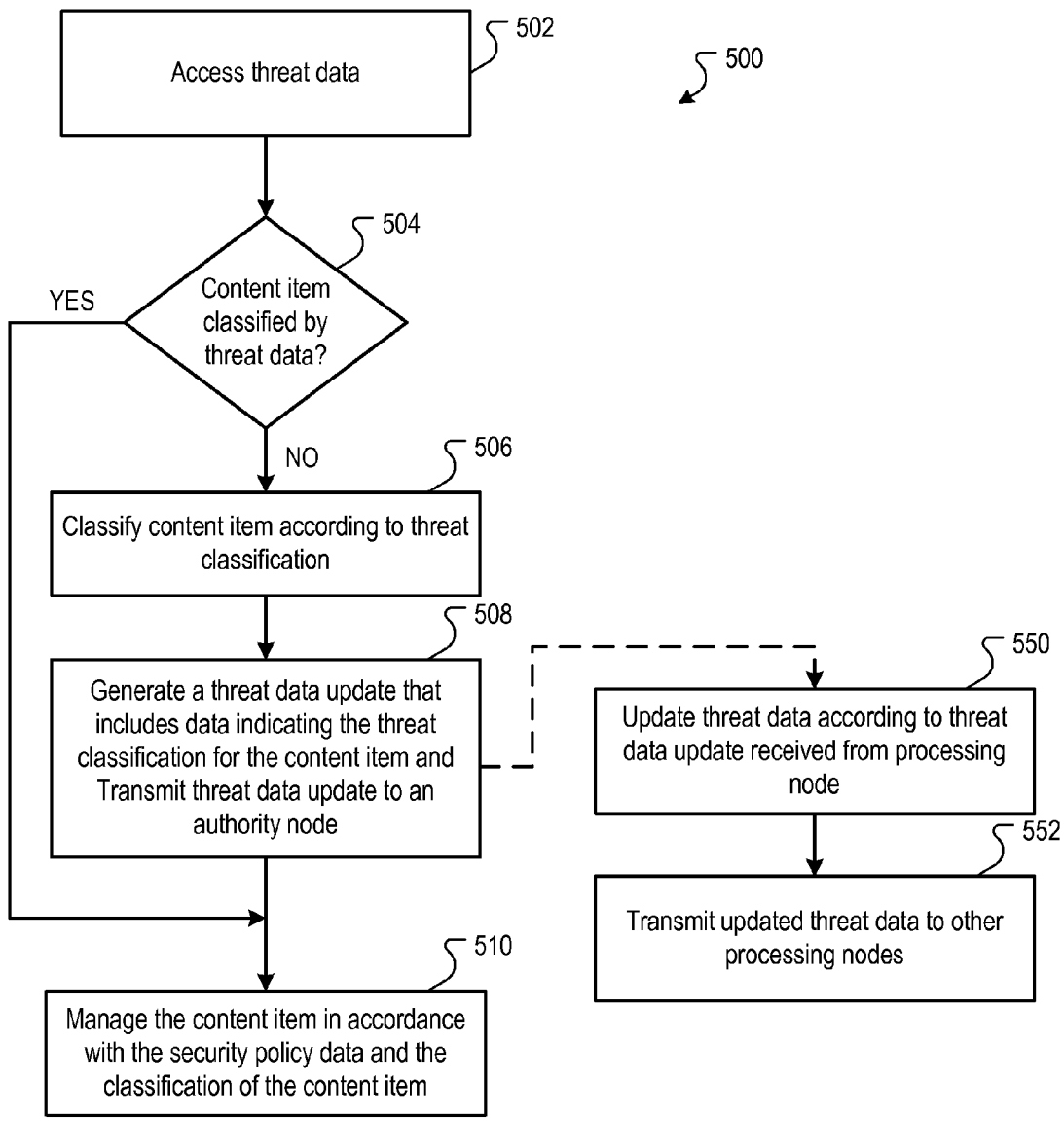
FIG. 5 is a flow diagram of an example process for handling threats in a distributed security system.

FIG. 5 is a flow diagram of an example process for handling threats in a distributed security system. The process 500 can, for example, be implemented in the system 100 of FIGS. 1 and 2, or in other security systems having a distributed architecture.

Stage 502 accesses threat data. For example, the processing node manager 118 can access threat data 114 stored in a processing node data store, e.g., a hard drive, a database, or in random access memory.

Stage 504 determines whether a content item is classified by threat data. For example, the processing node manager 118 can determine whether a content item requested by or transmitted from an external system is classified by the threat data 114.

If the content item is determined to be classified by the threat data 114, then stage 510 manages the content item in accordance with the security policy data 113 and the classification of the content item. For example, the processing node manager 118 can manage the content item according to the security classification of the content item and the security policy of the external system.

If however, the content item is determined to not be classified by the threat data 114, then stage 506 classifies the content item according to threat classification. For example, the processing node manager 118 can cause one or more of the data inspection engines 116 to perform the threat detection processes to classify the content item according to a threat classification.

Stage 508 then generates a threat data update that includes data indicating the threat classification for the content item from the threat detection process and transmits the threat data to an authority node. For example, the processing node manager 118 can generate the threat data updates and can transmit the threat data update to an authority node 120.

The process then executes stage 510 as described above.

In response to the execution of stage 508, stage 550 updates threat data according to threat data update received from processing node. For example, the authority node manager 128, in response to receiving the threat data update, updates the master threat data 124 stored in the authority node data store according to the threat data update received from the processing node 110.

Stage 552 transmits the updated threat data to other processing nodes. For example, the authority node manager 128 can automatically transmit the updated threat data to other processing nodes 110.

Figure 6:
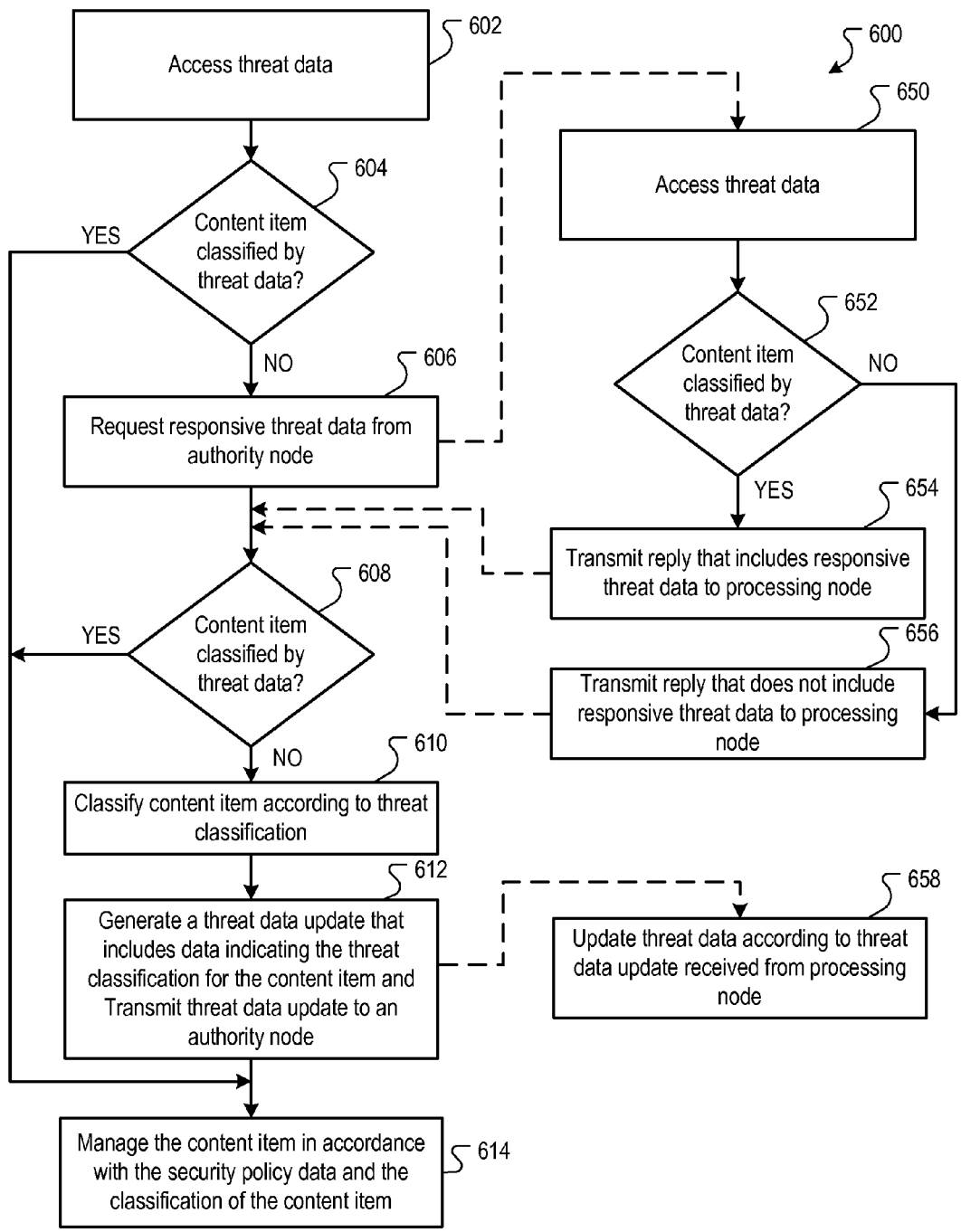
FIG. 6 is a flow diagram of an example process for handling threats in a distributed security system.

FIG. 6 is a flow diagram of an example process for handling threats in a distributed security system. The process 600 can, for example, be implemented in the system 100 of FIGS. 1 and 2, or in other security systems having a distributed architecture.

Stage 602 accesses threat data. For example, the processing node manager 118 can access threat data 114 stored in a processing node data store, e.g., a hard drive, a database, or in random access memory.

Stage 604 determines whether a content item is classified by threat data. For example, the processing node manager 118 can determine whether a content item requested by or transmitted from an external system is classified by the threat data 114.

If stage 604 determines that the content item is classified by the threat data 114, then stage 614 manages the content item in accordance with the security policy data 113 and the classification of the content item. For example, the processing node manager 118 can manage the content item according to the security classification of the content item and the security policy of the external system.

If stage 604 determines that the content item is not classified by the threat data, then stage 606 requests responsive threat data from an authority node. For example, the processing node manager 118 can request responsive threat data for the content item from the authority node 120.

Stage 608 determines if a reply received from the authority node in response to the request indicates whether the content item is classified by threat data. For example, the processing node manager 118 can determine if the reply received from the authority node 120 includes responsive threat data. If the processing node manager 118 determines that the reply received from the authority node 120 includes responsive threat data, then stage 614 can be executed as described above.

Conversely, if stage 608 determines that the reply received from the authority node does not include responsive threat data, then stage 610 classifies the content item according to threat classification. For example, the processing node manager 118 can cause one or more of the data inspection engines 116 to perform the threat detection processes to classify the content item according to a threat classification.

Stage 612 then generates a threat data update that includes data indicating the threat classification for the content item from the threat detection process and transmits the threat data to an authority node. For example, the processing node manager 118 can generate the threat data updates and can transmit the threat data update to an authority node 120.

The process then executes stage 614 as described above.

In response to the execution of stage 606, stage 650 accesses threat data. For example, the master threat data 124 at an authority node can be accessed by an authority node manager 128.

Stage 652 determines if the content item is classified by the accessed threat data. For example, the authority node manager can determine if the content item is classified by the master threat data 124.

If stage 652 determines that the content item is classified by the accessed threat data, then stage 654 transmits a reply to the requesting processing node that includes responsive threat data. For example, the authority node manager 128 can transmit a reply that includes the responsive threat data, after which stage 608 is executed.

Conversely, if stage 652 determines that the content item is not classified by the accessed threat data, then stage 656 transmits a reply to the requesting processing node that includes responsive threat data. For example, the authority node manager 128 can transmit a reply that does not include the responsive threat data, after which stage 608 is executed.

Stage 658 receives threat data update transmitted in response to the execution of stage 612 and updates threat data according to the treat data update received. For example, the authority node manager 128 can then update the master threat data 124 based on the threat data update received from the processing node manager 118.

Figure 7:
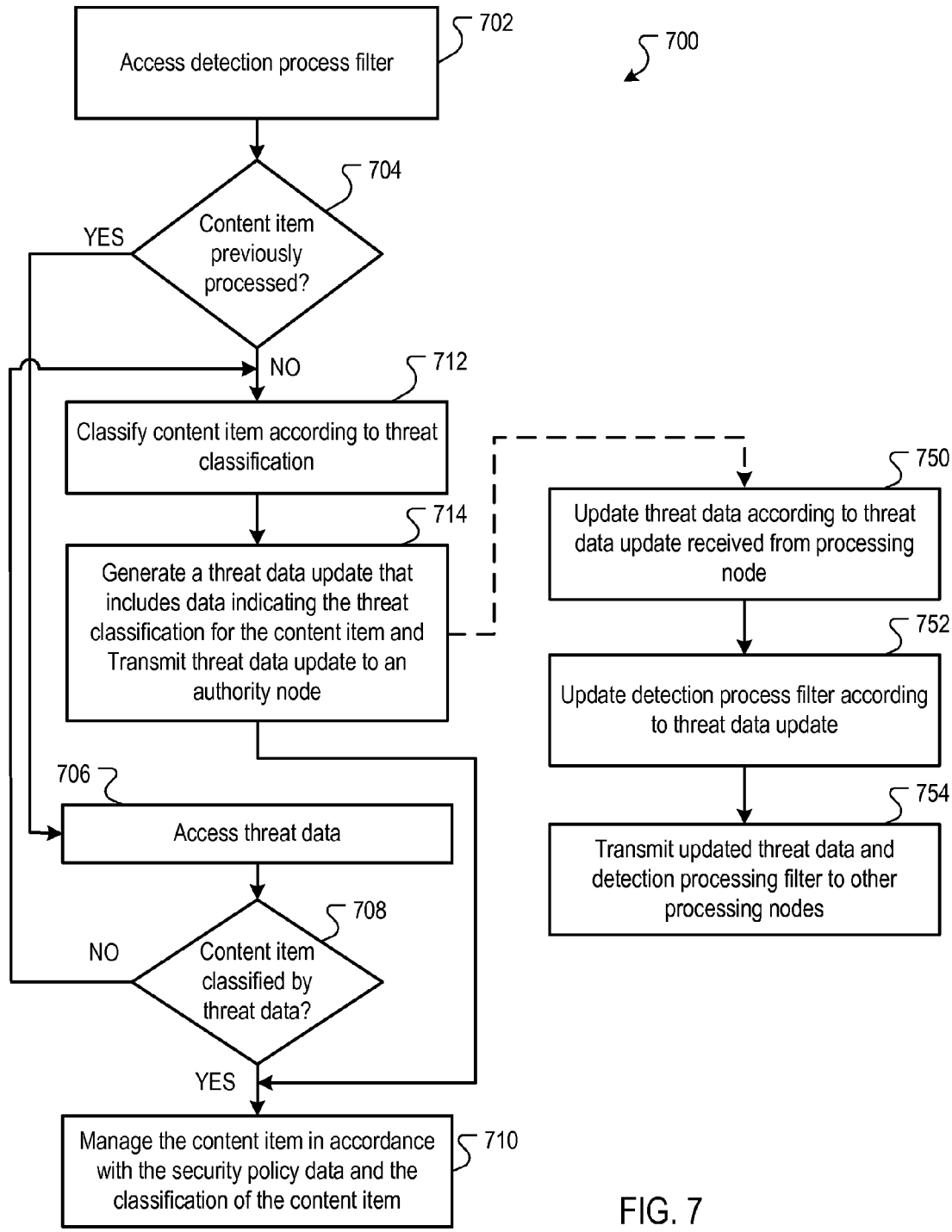
FIG. 7 is a flow diagram of an example process for handling threats in a distributed security system.

FIG. 7 is a flow diagram of an example process for handling threats in a distributed security system. The process 700 can, for example, be implemented in the system 100 of FIGS. 1 and 2, or in other security systems having a distributed architecture.

Stage 702 accesses a detection process filter. For example, the processing node manager 118 can access the detection process filter 112 stored in a processing node data store, e.g., a hard drive, a database, or in random access memory.

Stage 704 determines whether a content item has been previously processed. For example, the processing node manager 118 can determine whether a content item requested by or transmitted from an external system has been previously processed by a processing node based on the detection processing filter 112 output.

If stage 704 determines that the content item has been previously processed, then stage 706 accesses the threat data to determine the classification of the content item, and stage 708 determines if the content item is classified by the threat data. For example, the processing node manager 118 can access the threat data 114 and determine whether a content item requested by or transmitted from an external system is classified by the threat data 114.

If the content item is determined to be classified by the threat data, then stage 710 manages the content item in accordance with the security policy data and the classification of the content item. For example, the processing node manager 118 can manage the content item according to the security classification of the content item and the security policy 113 of the external system.

If however, the content item is determined to not be classified by the threat data 114, then stage 712 classifies the content item according to threat classification. For example, the processing node manager 118 can cause one or more of the data inspection engines 116 to perform the threat detection processes to classify the content item according to a threat classification.

Stage 714 then generates a threat data update that includes data indicating the threat classification for the content item from the threat detection process and transmits the threat data to an authority node. For example, the processing node manager 118 can generate the threat data updates and can transmit the threat data update to an authority node 120.

The process then executes stage 710 as described above.

In response to the execution of stage 714, stage 750 updates threat data according to threat data update received from processing node. For example, the authority node manager 128, in response to receiving the threat data update, updates the master threat data 124 stored in the authority node data store according to the threat data update received from the processing node 110.

Also in response to the execution of stage 714, stage 752 updates the detection process filter according to threat data update received from processing node. For example, the authority node manager 128, in response to receiving the threat data update, updates the master detection process filter 122 stored in the authority node data store according to the threat data update received from the processing node 110.

Stage 754 transmits the updated threat data to other processing nodes. For example, the authority node manager 128 can automatically transmit the updated threat data and detection process filter to other processing nodes 110.

Figure 8:
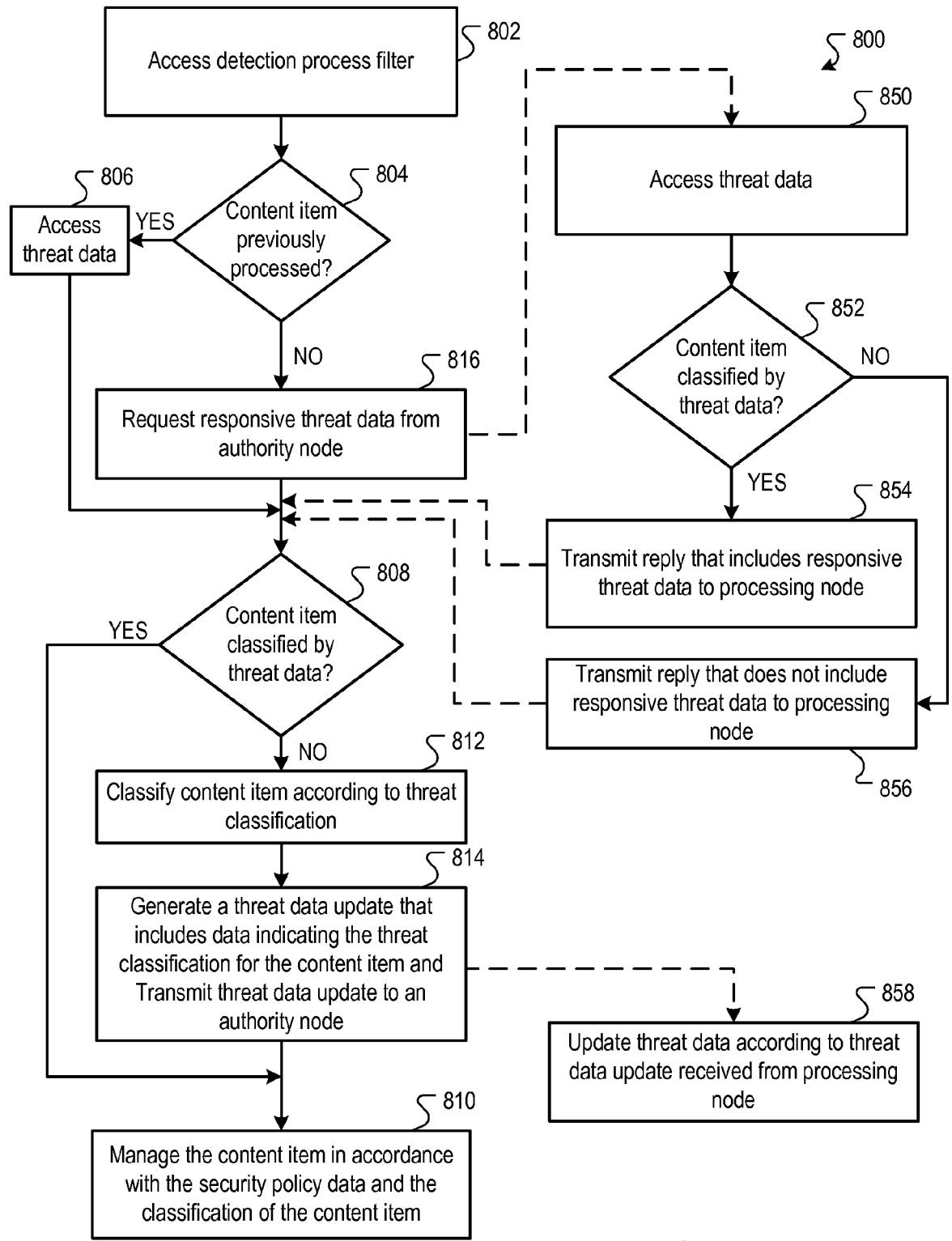
FIG. 8 is a flow diagram of an example process for handling threats in a distributed security system.

FIG. 8 is a flow diagram of an example process for handling threats in a distributed security system. The process 800 can, for example, be implemented in the system 100 of FIGS. 1 and 2, or in other security systems having a distributed architecture.

Stage 802 accesses a detection process filter. For example, the processing node manager 118 can access the detection process filter 112 stored in a processing node data store, e.g., a hard drive, a database, or in random access memory.

Stage 804 determines whether a content item has been previously processed. For example, the processing node manager 118 can determine whether a content item requested by or transmitted from an external system has been previously processed by a processing node based on the detection processing filter 112 output.

If stage 804 determines that the content item has been previously processed, then stage 806 accesses the threat data to determine the classification of the content item, and stage 808 determines if the content item is classified by the threat data. For example, the processing node manager 118 can access the threat data 114 and determine whether a content item requested by or transmitted from an external system is classified by the threat data 114.

If the content item is determined to be classified by the threat data, then stage 810 manages the content item in accordance with the security policy data and the classification of the content item. For example, the processing node manager 118 can manage the content item according to the security classification of the content item and the security policy 113 of the external system.

If stage 804, however, initially determines that the content item has not been previously processed, then stage 806 requests responsive threat data from authority node. For example, the processing node manager 118 can request responsive threat data for the content item from the authority node 120.

The process then returns to stage 808, which then determines if the content item is classified by the threat data. For example, the processing node manager 118 can determine if the reply received from the authority node 120 includes responsive threat data. If the processing node manager 118 determines that the reply received from the authority node 120 includes responsive threat data, the stage 810 can be executed as described above. Additionally, the detection process filter 112 stored at the processing node 110 can also be updated to indicate that the content item has been processed, and the responsive threat data can be stored in the threat data 114 stored at the processing node.

Conversely, if stage 808 determines that the reply does not include responsive threat data, then stage 812 classifies the content item according to threat classification. For example, the processing node manager 118 can cause one or more of the data inspection engines 116 to perform the threat detection processes to classify the content item according to a threat classification.

Stage 814 then generates a threat data update that includes data indicating the threat classification for the content item from the threat detection process and transmits the threat data to an authority node. For example, the processing node manager 118 can generate the threat data updates and can transmit the threat data update to an authority node 120.

Thereafter, stage 810 is executed.

In response to the execution of stage 816, stage 850 accesses threat data. For example, the master threat data 124 at an authority node can be accessed by an authority node manager 128.

Stage 852 determines if the content item is classified by the accessed threat data. For example, the authority node manager can determine if the content item is classified by the master threat data 124.

If stage 852 determines that the content item is classified by the accessed threat data, then stage 854 transmits a reply to the requesting processing node that includes responsive threat data. For example, the authority node manager 128 can transmit a reply that includes the responsive threat data, after which stage 808 is executed.

Conversely, if stage 852 determines that the content item is not classified by the accessed threat data, then stage 856 transmits a reply to the requesting processing node that includes responsive threat data. For example, the authority node manager 128 can transmit a reply that does not include the responsive threat data, after which stage 808 is executed.

Stage 858 receives threat data update transmitted in response to the execution of stage 814 and updates threat data according to the treat data update received. For example, the authority node manager 128 can then update the master threat data 124 based on the threat data update received from the processing node manager 118.

The various data exchange processes of FIGS. 4-8 are example processes for which the threat data and/or detection process filters can be updated in the system 100 of FIGS. 1 and 2. Other update processes, however, can also be used.

§5.0 Security Message Handling

As described above, the various data exchanges of FIGS. 4-8 can be used to distribute security messages, e.g., requests for threat data, guard table data, update notifications, etc., between the processing nodes 110 and the authority nodes 120. However, depending on the particular circumstances at a processing node 110 or an authority node 120, awaiting requests and/or sending responses to such requests may not realize a performance increase. Furthermore, in some situations, awaiting requests and/or sending responses to such requests may actually degrade overall system performance. In other words, the value of transmitting and/or responding to a security message may vary over time.

Figure 9:
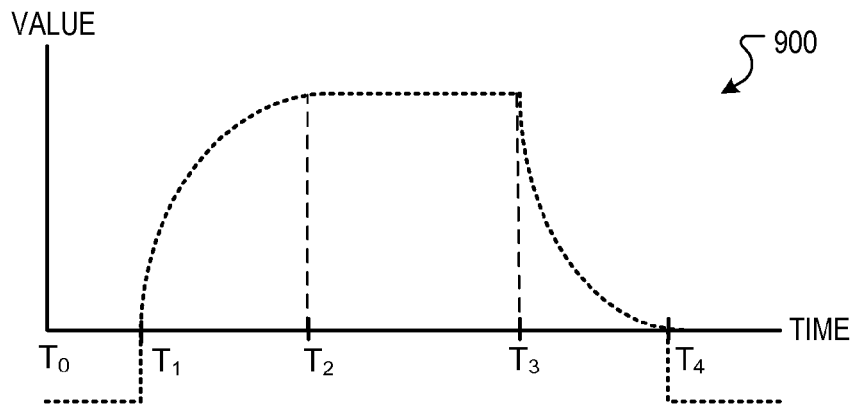
FIG. 9 is a timing diagram depicting security data information value over time.

FIG. 9 is a timing diagram 900 depicting security data information value over time. Example security data can include a security request, a reply to the security request, a policy data update, a threat data update, filter data, and the like. The value curve depicted in FIG. 9 is illustrative only, and other value functions can also be used, e.g., binary value functions, stepped value functions, etc.

The value of the security data from the time $T_0$ to $T_1$ is negative; increases to a maximum value between the times $T_1$ and $T_2$; maintains the maximum value between $T_2$ and $T_3$; decreases in value between $T_3$ and $T_4$; and is again negative for the time beyond $T_4$. The values are, for example, determined based on system constraints and parameters. For example, a processing node 110 may receive a request for a file download and may not have information related to the requested file. Thus, the processing node 110 may generate security data in the form of a request for threat data classifying a file (e.g., threat data indicating whether the file is infected, etc.). Because there is a lag time before the file can begin to be processed, e.g., packet reception related to the requested file is estimated to begin at time $T_1$, the processing node 110 can determine that there is no value in issuing the request before time $T_1$, and that other requests for security data in response to more immediate needs can be handled first.

Thereafter, between the times $T_1$ and $T_4$, the processing node 110 can prioritize the request against other pending requests based on corresponding values. At the time $T_4$, the processing node 110 may determine that it is now more cost effective in terms of one or more system resources (e.g., time, bandwidth, etc.) to scan the file at the processing node rather than issue the request or continue to await for a response to an issued request. The time $T_4$ thus represents a time beyond which the information become valueless and/or may be of negative value. The time $T_4$ denotes the deadline, beyond which the information is of negative value because it has to occupy a slot in a memory cache and has consumed bandwidth, for example.

In one implementation, the security request is a tuple of the form <object id, $[t_1, t_2, t_3, t_4]$>, where the times $[t_1, t_2, t_3, t_4]$ correspond to the times depicted in FIG. 9. In some implementations, a reply to a security request can be security data, such as threat data, filter data or policy data. For example, in some implementations, the security data can be a security digest tuple of the form <object id, security class, content class, time to live> that is produced by a data inspection engine 116 and specifies a security classification of an object (e.g., a file).

Another example of threat data can include an invalidation security digest. The invalidation security digest is a tuple of the form <object id, invalidate, time to live> that is a policy update, e.g., the deletion of a user, the deletion of a trusted source, etc. The threat data can be sent in response to a security request. Security data related to policy data and filter data can also be in the tuple form.

If the expected time to live of the security data is less than $t_1$, then the benefit of sending the security data is negative. Conversely, if the security data cannot be received before the time $t_4$, the benefit is again negative. In both cases, an alternative security operation of less cost can be performed (e.g., scanning a file locally at a processing node 110; ignoring a request at an authority node 120 if the authority node determines the reply cannot be received by the requesting processing node 110 within the time constraints; etc.). In general, security data is stale if it exceeds its expected time to live or exceeds the deadline of the requester.

The sequence $[t_1, t_2, t_3, t_4]$ and time to live are examples of one or more time constraints that can be used to prioritize the handling of security message processing and the security operations. More or fewer time constraints can be used. The time constraints are generated based on near real-time attributes of the distributed system, e.g., the quantity of pending requests, round trip times, node health, etc.

§5.1 Example Security Message Management in Processing and Authority Nodes

Figure 10:
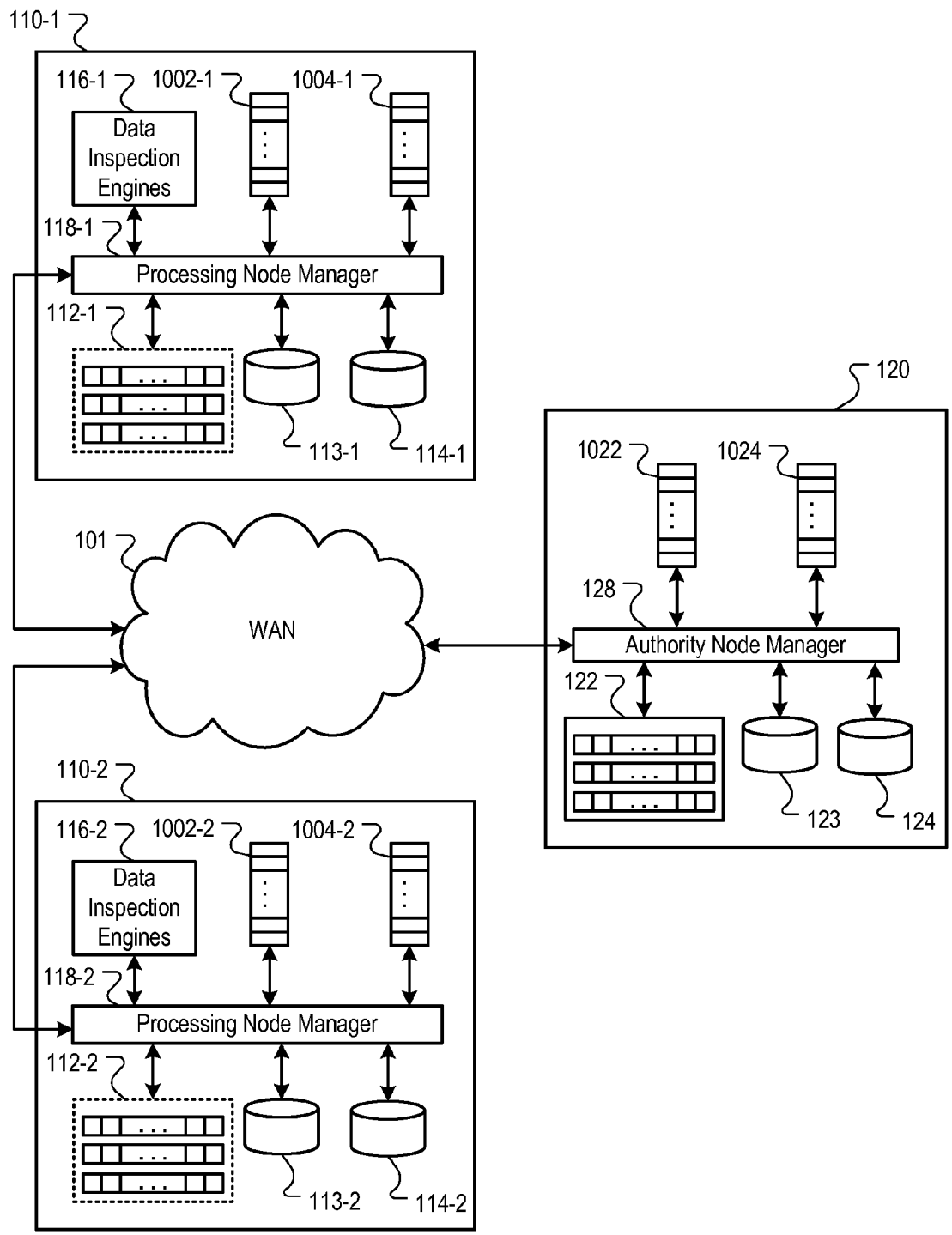
FIG. 10 is another block diagram of the system of FIG. 1 in which the components of FIG. 1 are illustrated in more detail.

FIG. 10 is another block diagram of the system of FIG. 1 in which the components of FIG. 1 are illustrated in more detail. The block diagram of FIG. 10 is similar to the block diagram of FIG. 2, but also includes example processing node request stores 1002, processing node reply/push stores 1004 in the processing nodes 110, and an authority node request store 1022 and an authority node reply/push store 1024 in the authority node 1022. Example processing node request stores 1002, processing node reply/push stores 1004, authority node request store 1022 and authority node reply/push store 1024 can include queues, stacks, and other data storage and processing schemes.

In each processing node 110, the processing node manager 118 manages the processing node request store 1002 and the processing node reply/push store 1004 to distribute or preclude distribution of security information, such as security requests, updates, replies, etc., in a manner that minimize a system costs. Likewise, the authority node manager 128 manages the authority node request store 1022 and the authority node reply/push store 1024 to distribute or preclude distribution of security information in a manner the minimizes system costs. In one implementation, security data and requests can be transmitted at regular intervals by appending to regularly-scheduled system heart-beat packets that are exchanged between the processing nodes 110 and the authority node 120. The security digests and requests are piggy-backed onto these packets a corresponding node manager 118 or 128 determines that such transmission still has an associated beneficial value.

In some implementations, the authority nodes 120 can prioritize requests for security data based on the time constraints. For example, an authority node manager 128 can prioritize the handling of the requests for security data based on the request arrival times and on the deadlines (e.g., handling requests based on the difference between the arrival time and the deadline, with those requests having the smallest differences first, provided the request can be fulfilled before the deadline); or based on the number of outstanding messages for a particular processing node (e.g., assigning a higher priority to requests from a processing node that is experiencing a heavy demand relative to other processing nodes).

§5.2 Example Time Constraint Factors

In the system of FIG. 10, time constraints are determined by various factors. For example, when a request (e.g., an HTTP Get to a server) is received at the processing node 110-1, a request can be made to authority node 120 for corresponding security data, e.g., threat data, policy data and/or filter data. This request indicates a deadline by which the processing node 110 expects a reply from the authority node 120. The deadline can, for example, be determined based on the estimated round-trip time between the processing node and the server, and optionally one or more other factors, such as the time required for the processing node 110 to determine such classification locally (e.g., by detecting for malware in response to the HTTP Get command). If the authority node manager 128 determines it can send a reply so that the reply is received by the processing node 110-1 within the time constrain, the authority node manager 128 will transmit the response.

Another example time constraint arises when the security aspects of a content item is to change within a time period. For example, a scheduled release of information on a web site that changes the security classification of the site may have an associated update that is to be provided to the processing nodes. Accordingly, the time to live of the update can be set to a time that occurs near in time but before the time of the scheduled update, e.g., 10 seconds before the scheduled update, for example.

Another example time constraint can be based on a queue size of the data inspection engines 116. For example, the wait time for a new content item (e.g., message) that measures how long the content item has to wait at a processing node 110 before it is threat detected can be estimated by the processing node manager 118. If the security attributes of this content can be provided from an authority node 110 before this estimated time, then processing of the content item by a data inspection engine 116 can be avoided. Thus each waiting content item can be associated with a deadline time constraint, and if the deadline is achievable within the authority node 120 node round trip time, a request for security data can be sent to the authority node 120 and/or sent from the authority node 120 to the processing node 110. For example, the processing node 110 may determine that a round trip time is 120 milliseconds, and that content inspection by a data inspection engine 116, given a queue size, will not be completed for at least 300 milliseconds. Thus, a cost savings of 180 milliseconds is potentially achieved by sending a request for the security data from the processing node 110.

The authority node, however, upon receiving the request, may determine that the security data will not reach the processing node 110 before the expiration of the 300 millisecond deadline. Accordingly, the authority node 120 can ignore the request. Conversely, upon receiving the request, the authority node may determine that the security data will reach the processing node 110 before the expiration of the 300 millisecond deadline. Accordingly, the authority node 120 can send a reply to the request.

Another example time constraint is dependent on processing nodes 110 communicating a heart beat message.

Another example time constraint is dependent on policy data updates. For example, policy invalidation messages have real-time constraints. One type of invalidation messages can specify when a user is removed from an enterprise, e.g., when a user leaves a company. Any credentials that are held by the user must be invalidated.

Another example time constraint is dependent on the propagation of specific patterns of attack vectors that are detected in one geographical area. For example, an attack vector may estimate an outbreak rate, and corresponding security messages may have a time constrain deadline $T_4$ that is an estimate of when messages related to the outbreak will no longer be of positive value.

Another example time constraint is based on a login of a roaming user at different processing nodes 110. When the user moves to a different location and thus a different processing node 110, e.g., the user has flown to another city during a workday, the login credentials must be available before the deadline, or the processing node 110 will resort to alternate security operations (e.g., checking the login credentials by communicating directly with the enterprise 200, for example).

Another example time constraint relates to the sending of a security message related to the detection of multiple users in the system with same credentials indicative of fraudulent access.

Still other time constraints can be determined, depending on the implementation of the system.

In summary, given a set of requests, replies, and/or updates having varying time constraints, the processing nodes managers 118 and the authority node managers 128 compute the best transmission times and/or determine whether to ignore such data to maximize the information value. The information valued of each message is a time varying quantity, with less value corresponding to arrivals that are too early, e.g., not the best use of the local cache and bandwidth, and decayed or negative value after a maximum time constraint.

§6.0 Example Processes for Handling Security Messages

Figure 11:
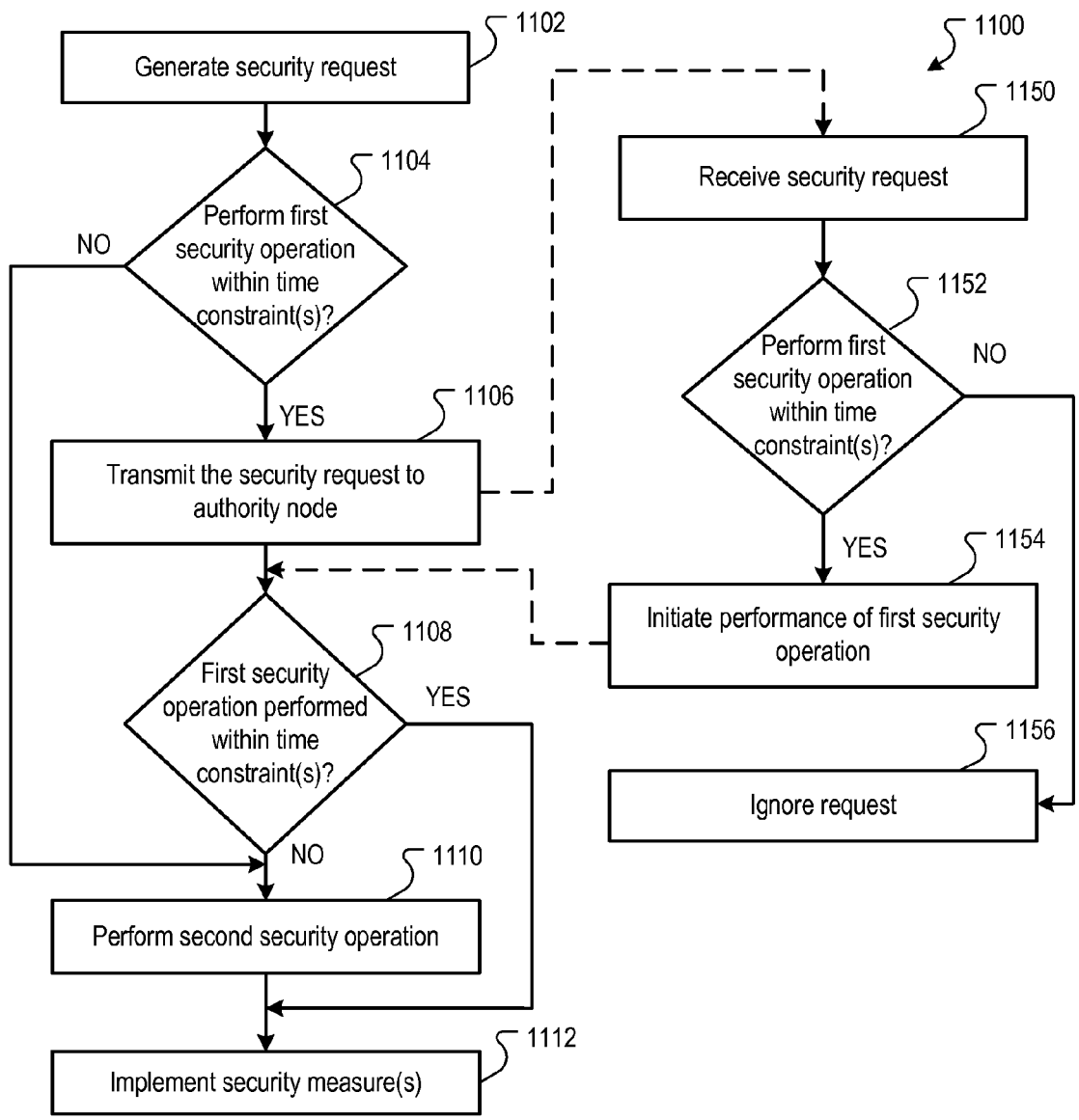
FIG. 11 is a flow diagram of an example process for handling security messages.

FIG. 11 is a flow diagram of an example process 1100 for handling security messages. The process 1100 can, for example, be implemented in the system 100 of FIGS. 1, 2 and 11, or in other security systems having a distributed architecture. The stages shown in FIG. 11 are each processes that can be executed independently and/or concurrently as appropriate.

Stage 1102 generates a security request. For example, a processing node manager 118 can generate a security request in response to receiving a content item.

Stage 1104 determines if a first security operation can be performed within one or more time constraints. For example, the processing node manager 118 can determine if the security operation of receiving security data responsive to a request can be received before a deadline time of $T_4$.

If stage 1104 determines that the first security operation can be performed within the one or more time constraints, then stage 1106 transmits the security request to the authority node. For example, the processing node manager 118 can transmit the security request to the authority node.

Stage 1108 determines if the first security operation has been performed within the one or more time constraints. For example, the processing node manager 118 can determine if a reply to the security request has been received by the deadline time of $T_4$.

If stage 1108 determines that the first security operation has been performed within the time constraint, then corresponding security measures are implemented in stage 1112. For example, the processing node manager 118 can determine that security data has been received, and can take corresponding actions as defined by the security data, such as disallowing access if the threat data and policy data define a content item that cannot be accessed by a particular user.

Conversely, if stage 1108 determines that the first security operation has not been performed within the time constraint, or if stage 1104 determines that the first security operation cannot be performed within the one or more time constraints, then stage 1110 performs a second security operation. For example, the processing node manager 118 can scan the content item by use of a data inspection engine 116. Thereafter, the process 1100 proceeds to stage 1112.

In response to the execution of stage 1106, stage 1150 receives the security request. For example, the authority node manager 128 can receive the security request from the processing node 110.

Stage 1152 determines if the first security operation can be performed within the one or more time constraints. For example, the authority node manager 128 can determine if a reply can be received by the processing node 110 by the time $T_4$.

If stage 1152 determines that the first security operation can be performed within the one or more time constraints, then stage 1154 initiates performance of the first security operation. For example, the authority node manager 128 can initiate performance of the first security operation by sending the reply to the processing node 110 (after which the processing node can determine if the first security operation is performed within the one or more time constraints, e.g., whether the reply is received by time $T_4$).

Conversely, if stage 1152 determines that the first security operation can not be performed within the one or more time constraints, then no operation is taken. For example, if the authority node manager 128 determines that the reply cannot be received by the processing node 110 by the time $T_4$, then the authority node manager 128 can ignore the request received in stage 1150.

Figure 12:
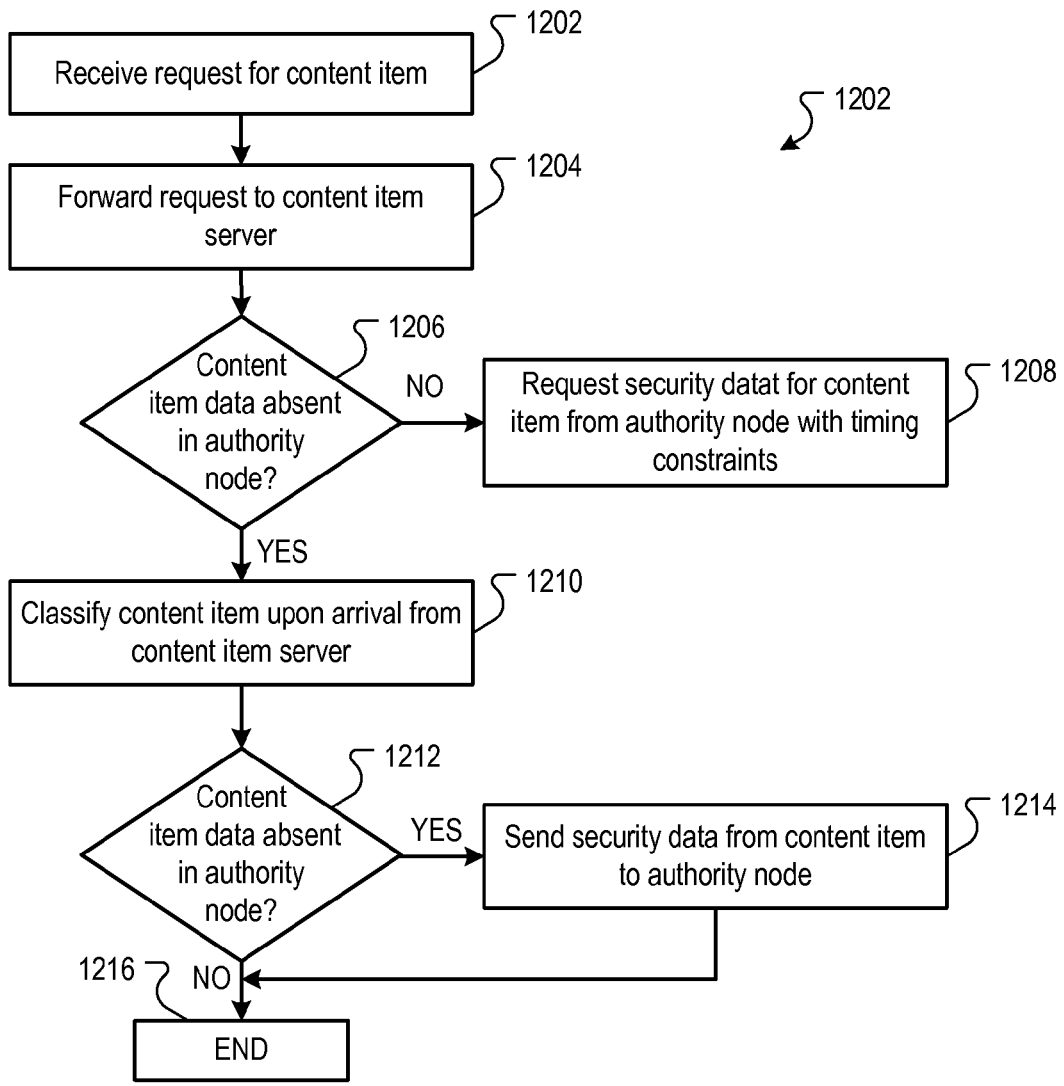
FIG. 12 is a flow diagram of another example process for handling security messages at a processing node.

FIG. 12 is a flow diagram of another example process 1200 for handling security messages at a processing node. The process 1200 can, for example, be implemented in the processing nodes 110 of FIGS. 1, 2 and 10. The process 1200 illustrates security data handling for a content item that is requested by a processing node and for which security data is not stored in the processing node at the time of the request.

Stage 1202 receives a request for a content item. For example, the processing node manager 118 can receive a request for a content item, such as a file or webpage from a server.

Stage 1204 forwards the request to a content item server. For example, the processing node manager 118 can forward the request for the content item to a server hosting the content item.

Stage 1206 determines if content item data is absent in the authority node 120. For example, the processing node manager 118 can determine if the content item has been classified by the system, e.g., by accessing detection processing filter data 112 stored at the processing node 110.

If stage 1206 determines that content item data is not absent in the authority node 120, then stage 1208 sends a request to the authority node for security data. The request includes timing constraints. For example, if the processing node manager 118 determines that the content item data is not absent in the authority node 120, then the processing node manager 118 can send a request for security data, e.g., a security digest, to the authority node 120 with a deadline time constraint of $T_4$ after the occurrence of a time to live at $T_1$.

Conversely, if stage 1206 determines that content item data is absent in the authority node 120, then the stage 1210 classifies the content item upon arrival from the content item server.

Stage 1212 then determines if content item data is absent in the authority node 120. For example, the processing node manager 118 may check to determine if it the authority node 120 received an update related to the content item, such as may occur if the content item is carrying a virus during an outbreak and has been detected by another processing node 110 in the system.

If stage 1212 determines that content item data is absent in the authority node 120, then stage 1214 sends the security data, e.g., the security digest, to the authority node 120, after which the process ends at stage 1216. For example, the processing node manager 118 may determine that content item data is absent in the authority node 120, and thus send the security digest that was generated by a data inspection engine 116.

Figure 13:
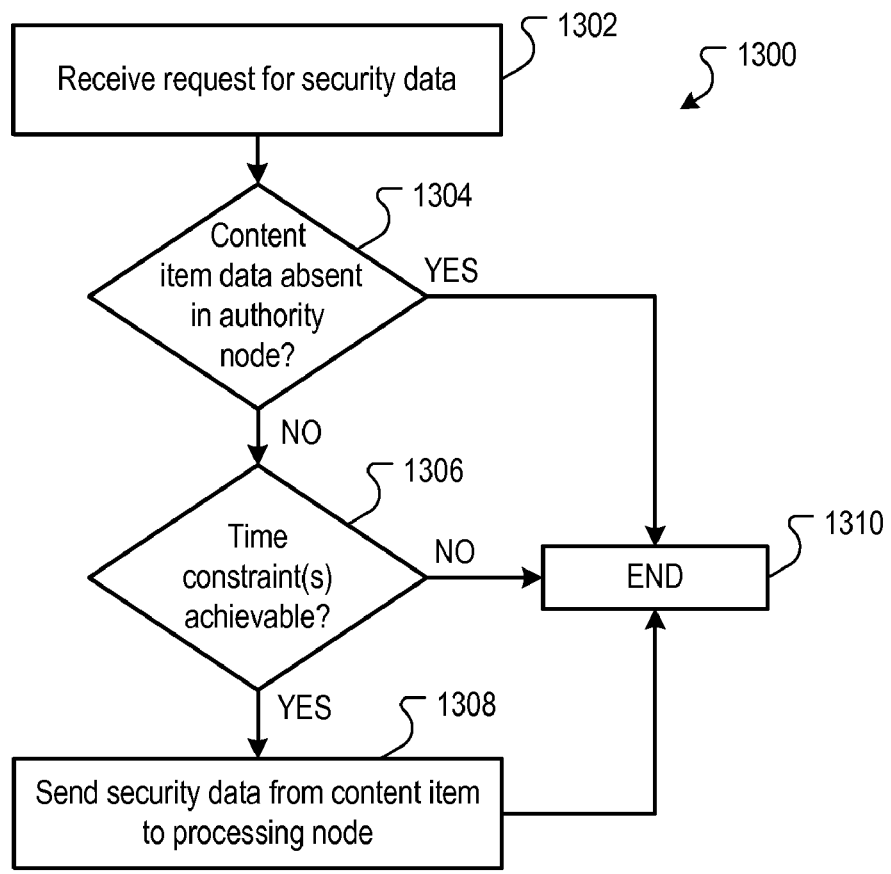
FIG. 13 is a flow diagram of another example process for handing security messages at an authority node.

FIG. 13 is a flow diagram of another example process 1300 for handing security messages at an authority node. The process 1300 can, for example, be implemented in the authority nodes 120 of FIGS. 1, 2 and 10, and illustrates the handling of a security data request at an authority node.

Stage 1302 receives a request for security data. For example, the authority node manager 120 can receive a request for security data with time constraints, such as the request sent in response to the execution of stage 1208 of FIG. 12 at a processing node 110.

Stage 1304 determines if content item data responsive to the request is stored in the authority node. For example, the authority node manager 128 can determine if security data or detection process filter data responsive to the request is stored in the authority node 120.

If stage 1304 determines that no content item data responsive to the security digest is stored in the authority node, then the request is ignored in stage 1310. Conversely, if stage 1304 determines that content item data responsive to the security digest is stored in the authority node, then stage 1306 determines if the security data can be delivered within the time constraints. For example, the authority node manager 128 can determine if a security digest can be received by a deadline time of $T_4$.

If stage 1306 determines if the security data can be delivered within the time constraints, then stage 1308 sends the security data. For example, the authority node manager 128 can determine that responsive security data can be delivered before the deadline time of $T_4$, and transmit the security data to the processing node 110.

Figure 14:
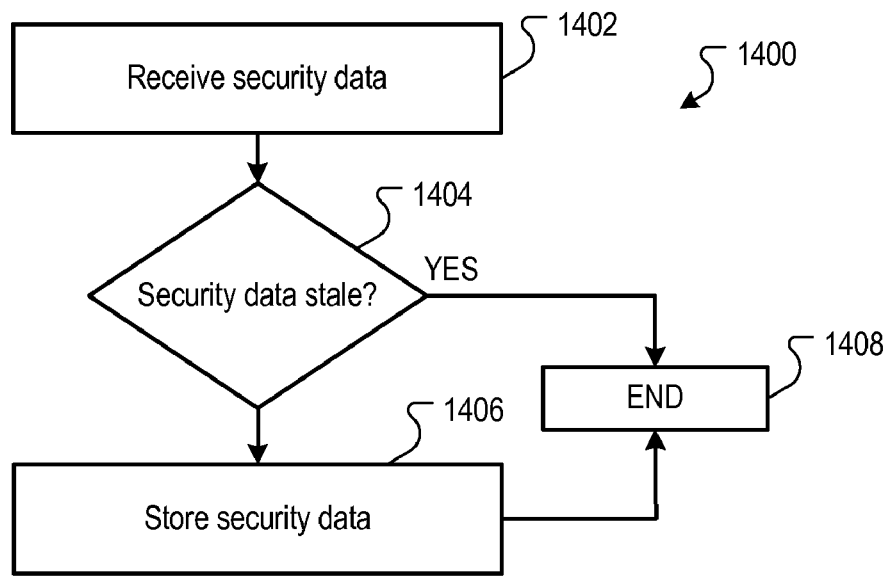
FIG. 14 is a flow diagram of another example process for handing security messages at an authority node.

FIG. 14 is a flow diagram of another example process for handing security messages at an authority node. The process 1400 can, for example, be implemented in the authority nodes 120 of FIGS. 1, 2 and 10, and illustrates the handling of received security data at the authority nodes 120.

Stage 1402 receives security data. For example, the authority node manager 128 can receive a data inspection security digest or an invalidation security digest. For example, the authority node manager 128 can receive a data inspection security digest or an invalidation security digest from a processing node 110. The security digest can include a deadline time, e.g., a deadline time $T_4$.

Stage 1404 determines if the security data is stale. For example, the authority node manager 128 can determine if the security digest is received after the time $T_4$.

If stage 1404 determines the security data is stale, then the process ends at stage 1408. For example, if the authority node manager 128 determines the security digest is stale, then it can ignore the security digest.

Conversely, if stage 1404 determines the security data is not stale, then stage 1406 can store the security data. For example, if the authority node manager 128 determines the security digest is not stale, then the authority node manager 128 can store the security digest in a data store in the authority node 120, e.g., store an update to threat data, process filter data, or policy data, as appropriate.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A network security system, comprising:
a plurality of processing nodes communicatively coupled to an authority node via a network, each of the plurality of processing nodes and the authority node are separately connected to the network, wherein the plurality of processing nodes and the authority node comprising a distributed security system, and the authority node is configured to store and distribute policy data to each of the plurality of processing nodes, each processing node comprising a processing node manager configured to perform operations comprising:
identifying a content item;
generating a security request for the content item, the security request comprising one or more time constraints based on security data information value over time;
determining whether a first security operation for the security request can be performed within the one or more time constraints; and
transmitting the security request to the authority node if the processing node determines that the first security operation can be performed within the one or more time constraints;
performing a second security operation on the content item at the processing node if the processing node manager determines that the first security operation can not be performed within the one or more time constraints.

2. The network security system of claim 1, wherein each processing node manager is further configured to perform operations comprising:
determining if the first security operation is not performed within the one or more time constraints after the security request is transmitted; and performing the second security operation on the content item at the processing node if the processing node manager determines that first security operation is not performed within the one or more time constraints.

3. The network security system of claim 1, wherein: the one or more time constraints comprise a maximum time; and the operation of determining whether the first security operation for the security request can be performed within the one or more time constraints comprises determining whether the first security operation can be performed before the occurrence of the maximum time.

4. The network security system of claim 1, wherein: the one or more time constraints comprise a minimum time; and the processing node manager is further configured to perform operations comprising transmitting the security request only after the occurrence of the minimum time.

5. The network security system of claim 4, wherein:
the one or more time constraints comprise a maximum time; and
the operation of determining whether the first security operation for the security request can be performed within the one or more time constraints comprises determining whether the first security operation can be performed before the occurrence of the maximum time.

6. The network security system of claim 1, wherein the first security operation comprises receiving a reply to the security request at the processing node that includes security data responsive to the security request.

7. The network security system of claim 1, wherein the processing node further comprises:
a plurality of data inspection engines, each data inspection engine configured to perform operations comprising a threat detection process to classify content items according to a threat classification for a corresponding threat;
wherein:
the security request comprises a request for responsive threat data;
the first security operation comprises receiving a reply to the security request at the processing node for responsive threat data; and
a second security operation comprises performing a threat detection process with the data inspection engines on the content item to generate the responsive threat data.

8. The network security system of claim 1, wherein:
the content item data transmission comprises a login request;
the security request comprises a request for login credentials;
the first security operation comprises receiving a reply to the request for the login credentials; and
a second security operation comprises denying a login request.

9. A network security system, comprising:
an authority node communicatively coupled to a processing node via a network, each of the processing node and the authority node are separately connected to the network, wherein the authority node and the processing node comprising a distributed security system, the authority node is configured to store and distribute policy data to the processing node, and the authority node comprising an authority node manager configured to perform operations comprising:
receiving a request for a first security operation from the processing node, the security request defining one or more time constraints based on security data information value over time;
determining whether the first security operation can be performed within the one or more time constraints; and
initiating performance of the first security operation only if the authority node manager determines that the first security operation can be performed within the one or more time constraints;
performing a second security operation on the content item at the processing node if the authority node manager determines that the first security operation can not be performed within the one or more time constraints.

10. The network security system of claim 9, wherein initiating performance of the first security operation comprises generating a reply responsive to the security request and transmitting the reply from the authority node to a processing node that issued the request.

11. The network security system of claim 10, wherein the one or more time constraints comprise a maximum time; and
the operation of determining whether the first security operation can be performed within the one or more time constraints comprises determining whether the reply can be received at the processing node before the occurrence of the maximum time.

12. The network security system of claim 11, wherein the reply comprises a security digest.

13. The network security system of claim 9, wherein initiating performance of the first security operation comprises storing security data in an authority node data store.

14. The network security system of claim 13, wherein:
the one or more time constraints comprise a maximum time; and
the operation of determining whether the first security operation for the first security instance can be performed within the one or more time constraints comprises determining whether the security data can be stored before the occurrence of the maximum time.

15. The network security system of claim 13, wherein the security data comprises threat data.

16. The network security system of claim 13, wherein the security data comprises a threat data update.

17. The network security system of claim 13, wherein the security data comprises a process filter update.

18. The network security system of claim 9, further comprising:
receiving requests for other first security operations, each of the security requests defining one or more time constraints;
prioritizing the requests based in part on the time constraints; and
initiating performance of the requested first security operations according to the prioritization of the requests.

19. A computer-implemented method for handling security requests, comprising:
generating a security request at a processing node, the security request comprising one or more time constraints based on security data information value over time;
determining whether a first security operation for the security request can be performed within the one or more time constraints;
transmitting the security request from the processing node to an authority node if it is determined that the first security operation can be performed within the one or more time constraints, each of the processing node and the authority node are separately connected to a network, wherein the authority node and the processing node comprising a distributed security system, and the authority node is configured to store and distribute policy data to the processing node; and performing a second security operation at the processing node if it is determined that the first security operation can not be performed within the one or more time constraints.

20. The computer-implemented method of claim 19, further comprising:

determining if the first security operation is not performed within the one or more time constraints after the security request is transmitted; and performing the second security operation at the processing node if it is determined that the first security operation is not performed within the one or more time constraints.

21. The computer-implemented method of claim 19, wherein:

the one or more time constraints comprise a maximum time; and determining whether the first security operation for the security request can be performed within the one or more time constraints comprises determining whether the first security operation can be performed before the occurrence of the maximum time.

22. The computer-implemented method of claim 19, wherein:

the one or more time constraints comprise a minimum time; and further comprising transmitting the security request only after the occurrence of the minimum time.

23. The computer-implemented method of claim 22, wherein:

the one or more time constraints comprise a maximum time; and determining whether the first security operation for the security request can be performed within the one or more time constraints comprises determining whether the first security operation can be performed before the occurrence of the maximum time.

24. The computer-implemented method of claim 19, wherein the first security operation comprises receiving at the processing node a reply to the security request that includes security data responsive to the security request.

25. The computer-implemented method of claim 19, wherein:

the security request comprises a request for responsive threat data;

the first security operation comprises receiving at the processing node a reply to the request for responsive threat data; and the second security operation comprises initiating at the processing node a threat detection process to generate the responsive threat data.

26. A computer-implemented method for handling security requests, comprising:

receiving at an authority node a request for a first security operation, the security request defining one or more time constraints based on security data information value over time;

determining whether the first security operation can be performed at a processing node that issued the request within the one or more time constraints, each of the processing node and the authority node are separately connected to a network, wherein the authority node and the processing node comprising a distributed security system, and the authority node is configured to store and distribute policy data to the processing node; and initiating performance of the first security operation only if it is determined that the first security operation can be performed within the one or more time constraints;

performing a second security operation on the content item at the processing node if the authority node manager determines that the first security operation can not be performed within the one or more time constraints.

27. The computer-implemented method of claim 26, wherein initiating performance of the first security operation comprises generating a reply responsive to the security request and transmitting the reply to the processing node that issued the request for reception by the processing node.

28. The computer-implemented method of claim 26, wherein:

the one or more time constraints comprise a maximum time; and determining whether the first security operation can be performed within the one or more time constraints comprises determining whether the reply can be received at the processing node before the occurrence of the maximum time.

29. The computer-implemented method of claim 26, wherein initiating performance of the first security operation comprises storing security data in an authority node data store.

30. The computer-implemented method of claim 26, wherein the digest comprises threat data.

* * * * *